Figure 2:
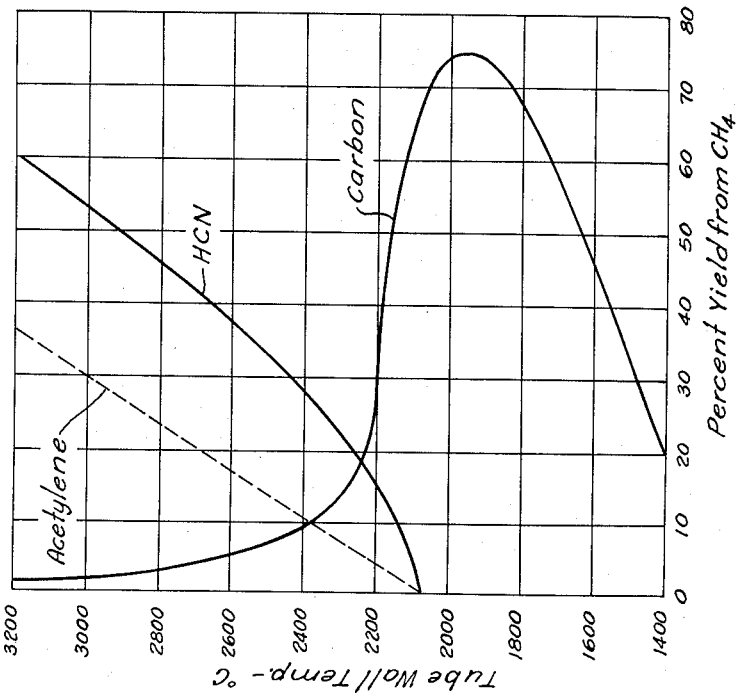
Figure 1:
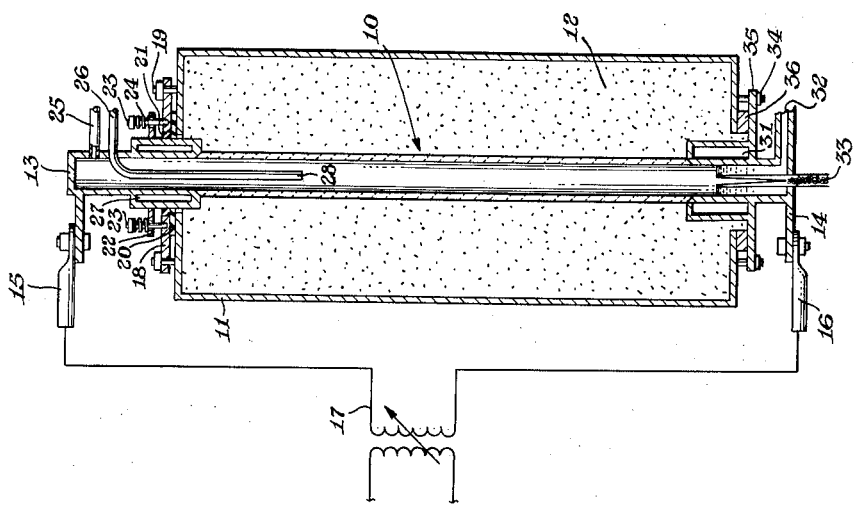

Dec. 13, 1960 T. W. MULCIHY, JR 2,964,384
PROCESS FOR THE PRODUCTION OF HYDROGEN CYANIDE
Filed Dec. 23, 1957

INVENTOR.
Thomas W. Mulcihy, Jr.
BY
Griswold & Burdick
ATTORNEYS

United States Patent Office 2,964,384
Patented Dec. 13, 1960

2,964,384

PROCESS FOR THE PRODUCTION OF HYDROGEN CYANIDE

Thomas W. Mulcihy, Jr., Freeport, Tex., assignor to The Dow Chemical Company, Midland, Mich., a corporation of Delaware Filed Dec. 23, 1957, Ser. No. 704,767

3 Claims. (Cl. 23—151)

This invention relates to an improved process for the production of hydrogen cyanide by the reaction of nitrogen and a hydrocarbon material at high temperatures.

It has been known that a hydrocarbon, as a gas or vapor, in admixture with a gaseous nitrogen containing compound such as ammonia will react at high temperatures to form hydrogen cyanide. The reaction between ammonia and methane, for example, occurs between 1000 and 1600° C. to give good yields of HCN. It is likewise known that the passage of a hydrocarbon, as a gas or vapor, together with nitrogen directly through an electric arc, followed by rapid quenching, will yield hydrogen cyanide and acetylene as products. But the highest yields of this reaction are always poor and obtained at temperatures in the range of 3300 to 3500° C. with the formation of prohibitive quantities of carbon. At present, there is no commercially satisfactory non-catalytic process available for the production of hydrogen cyanide from nitrogen in a hydrocarbon gas or vapor.

It is, therefore, an object of this invention to provide an improved high temperature non-catalytic process, for the production of hydrogen cyanide from nitrogen and a hydrocarbon, which is commercially practicable.

Another object of this invention is to provide a non-catalytic process for making hydrogen cyanide in which the yield of hydrogen cyanide obtained is improved.

Other objects and advantages of the present invention will become apparent from the following detailed description thereof, when read in conjunction with the accompanying drawings in which Figure I is a diagrammatic illustration in section elevation of an apparatus which may be used in practicing the process of the present invention, and Figure II is a graph showing the relationship between temperature and percent conversion of methane according to the invention, to HCN, acetylene and carbon wherein the ordinate is the temperature in degrees centigrade and the abscissa is the weight percent yield.

It has been discovered that by reacting nitrogen with a hydrocarbon as a gas or vapor, at a substantially constant temperature in excess of 2200° C., effected by radiant heating, for a time sufficient to allow substantially complete reation, high yields of hydrogen cyanide and concomitant low yields of carbon are obtained without the use of a catalyst. The hot product gas thereby obtained, containing HCN, may then be water quenched or cooled in any appropriate manner and subjected to treatment to recover therefrom the hydrogen cyanide by any conventional method.

The term "hydrocarbon," as used herein, means any chemical compound consisting entirely of carbon and hydrogen, whether saturated or unsaturated, and without regard to chain length or molecular configuration, so long as the compound is capable of existing in the vapor or gaseous state without decomposition as when heated to its boiling point at atmospheric pressure. Methane is the preferred hydrocarbon for use in this method although gases, such as ethane, propane and butane, unsaturates such as ethylene, propylene, butylenes, acetylene and methyl acetaylene and aromatics such as benzene, toluene and xylene and mixed hydrocarbons such as fuel oil and kerosene may be employed when suitably vaporized.

It is necessary to this process that the reaction zone be at a substantially constant high temperature throughout, such that the reactants when in the reaction zone will thereby at all times be maintained at a temperature in excess of 2200° C. From the work leading to this invention, it is postulated that the low yields and high carbon formation obtained by the conventional reaction of nitrogen and a hydrocarbon in an arc are due to temperature fluctuation and large temperature gradients resulting from the fact that only point contact is made between the arc and the reactants at the reaction temperature. The wide temperature variation associated with the conventional direct arc method is overcome in this invention and higher yields are obtained by the use of a reaction zone of substantial volume, heated uniformly throughout, as by radiant heat.

The use of radiant heating permits the reacting gases to reside in a reaction zone having negligible temperature gradients throughout its volume for a period of time sufficient to obtain substantially complete reaction without excessive carbon formation. This radiant heating may be provided in any suitable manner as by resistance heating of conducting material, flame heating in a non-porous reactor or in any other appropriate manner, as for example, by heating the inside walls of a reactor radiantly to a non-fluctuating temperature in excess of 2200° C. A radiantly heated reactor has the advantage that substantially the same temperature obtains throughout its heated volume and is the type of reactor employed in the invention.

While the residence or reaction times, employed in the invention, are only on the order of 0.01 to 0.8 second, the reactants are at reaction temperatures for substantially all of this time. The contrast is great when compared with the uneven heating and instantaneous point contact of the arc process.

Therefore, the term "constant temperature," as used herein, means temperature free from substantial fluctuations as well as a relatively uniform temperature profile throughout a major portion of the reactor. Such conditions are diametrically opposed to the conditions associated with the arc process.

The reactor shown in Figure I is composed of a graphite tube or electrode 10 surrounded by a steel jacket 11 and insulated therefrom by insulating material 12 such as carbon black. The graphite tube 10 is tapered at the ends and held in position at either end by two copper electrode holders 13 and 14 which are connected by copper cables 15 and 16 to a variable transformer 17 and thence to a power source (not shown). A flange 18 is fastened to the steel jacket 11 by bolts 19—19 and separated from the said jacket by insulating gasket 20 to prevent current leakage from the electrode holder to the jacket. An O ring 21 seats against flange 18 and electrode holder 13 to allow vertical movement of the electrode holder and at the same time to provide a vapor seal and electrical barrier. A plate 22 is immovably attached to the electrode holder 13. Bolts 23—23 pass freely through the plate 22 and threadably engage flange 18. As the electrode 10 expands upon heating, the electrode holder 13 and plate 22 move upwardly against the tension maintained by springs 24—24. This arrangement allows for expansion of the graphite tube without cracking. The electrode holder 13 is likewise fitted with a nitrogen feed line 25, methane feed line 26 and a water jacket space 27. The methane feed line 26 enters the electrode holder 13 and continues downwardly into the graphite tube 10 and concentrically therewith. That portion of the methane feed line which is inside the reactor is cooled by water jacket 28 made from copper tube tracing positioned around the feed line.

The electrode holder 14 at the base of the reactor contains a water jacket space 31, a quench water inlet 32 and a quench water outlet 33, and is bolted immovably to the steel jacket 11 by bolts 34—34 passing through a flange 35 which forms an integral part of electrode holder 14. A gasket 36 is composed of a non-conducting material and is positioned between the plate 35 and the jacket 11 to insulate the electrode holder 14 from the steel jacket 11. All bolts, flanges, and gaskets at both upper and lower ends of the reactor are coated so as to be non-conductors to prevent current leakage from the electrode holders to the jacket. The quench water enters through quench water inlet 32 and overflows into the quench water outlet 33, which also serves as an outlet for the product gas. A portion of the water is converted to steam by contact with the hot reactor product gas as it leaves the reactor through quench water outlet 33. Both the product gas and the quench water will contain HCN which may be easily separated by known methods.

The method of producing HCN according to the invention using the apparatus shown in Figure I is illustrated by the following examples in which methane and nitrogen were reacted at various temperatures including temperatures outside the scope of the invention for comparison.

*Example I*

Nitrogen flow through feed line 25 was started. The quench system was then activated by feeding water through quench water inlet 32 and into electrode holder 14 where it over-flowed into quench water outlet 33. Electrical current was applied to the graphite tube 10 and simultaneously therewith cooling-water flow was started to water jackets 27 and 31. When the inside wall of the graphite tube had reached the desired reaction temperature, the methane flow was introduced through a water cooled methane feed line 26. The water cooling of the methane feed line was designed to prevent the methane from reaching its decomposition temperature prior to making contact with the heated nitrogen. This may be accomplished by adjusting the rate of flow of the water to the water jacket around the methane feed line. The methane passed from the cooled feed line and entered an atmosphere of nitrogen at reaction temperature. The hot reaction products were rapidly cooled with quench water and passed from the reactor through quench water outlet 33. All experiments shown in the table below were made at essentially atmospheric pressure, the contact time prior to quenching was 0.5 second and the nitrogen and methane were fed in a 1:1 molar ratio. Both nitrogen and methane were obtained from commercial sources. The methane was obtained from a natural gas pipe line and the nitrogen from a high pressure cylinder. The following tabulation of results obtained will illustrate specifically the effects of constant temperature upon yield of HCN, acetylene and carbon from methane and nitrogen.

| Temp., °C. | Yield of HCN, Wt. Percent | Yield of $C_2H_2$, Wt. Percent | Yield of Carbon, Wt. Percent |
| --- | --- | --- | --- |
| 1,540 | 0.05 | 0.05 | 37 |
| 1,860 | 0.05 | 0.05 | 73 |
| 2,100 | 5.0 | 1.5 | 65 |
| 2,440 | 30.0 | 13 | 8 |
| 2,640 | 40.0 | 18 | 5 |
| 2,900 | 53.0 | 27 | 3 |
| 3,200 | 58.0 | 36 | 1 |

The yield of HCN was determined by titration of the quench water with silver nitrate according to standard procedure. The acetylene produced was determined by Orsat analysis and carbon was determined by gravimetric analysis of the quench water. These data are set forth in graph form in Figure II which shows the relationship between temperature and percent conversion of methane to HCN, acetylene and carbon in the high temperature non-catalytic reaction of nitrogen with methane. At tube wall temperatures below 2050° C. the only product is carbon. As the temperature increases, however, the formation of carbon decreases sharply and the yield of HCN increases rapidly.

It is essential to this process therefore that the temperature of reaction be maintained above 2200° C. and preferably below 4000° C. with the preferred range being between 2800 and 3200° C. In order to obtain the highest yields and most efficient operation in this temperature range, it is desirable, though not essential, to feed the hydrocarbon into the reactor in such a manner that it will not contact the interior heated surface of the reactor before reaching reaction temperature. This may be accomplished in any one of a variety of ways. It has been found desirable, however, to preheat the gaseous hydrocarbon material to a temperature below its decomposition point and to feed it into the center of the reactor while simultaneously mixing this reactant with nitrogen which has been heated to reaction temperature. If the hydrocarbon is allowed to contact the hot interior reactor surface before reaching reaction temperature small carbon deposits will form and the HCN yield will be slightly lowered.

*Example II*

The procedure of Example I was repeated except that propane in one instance and propylene in the other as the feed gas were substituted for methane. The following tabulation shows the results obtained.

| Hydrocarbon Feed Gas | Temp., °C. | Yield of HCN, Wt. Percent | Yield of $C_2H_2$, Wt. Percent | Yield of carbon, Wt. Percent |
| --- | --- | --- | --- | --- |
| $C_3H_6$ | 3,000 | 50 | 33 | 2 |
| $C_3H_8$ | 3,120 | 57 | 28 | 2 |

In this process for the high temperature non-catalytic production of HCN, the reaction time or residence time in the reactor appears to have little or no effect upon the reaction over a comparatively wide range, provided the contact time at reaction temperature is greater than instantaneous. Reaction times of from 0.01 to 0.8 second may be used with no noticeable effect on the products obtained from the reaction. Residence times of from 0.3 to 0.7 second are preferred. Likewise the ratio of nitrogen to the hydrocarbons can be varied widely. The increase of either component beyond stoichiometrical amounts merely decreases the yield based on that component. Ratios of nitrogen to hydrocarbon ranging from 3:1 to 1:3 are preferred, therefore.

Conversions of greater than 95% of the hydrocarbon feed to useful products may be obtained by this process with conversion to carbon so small as to be insignificant. Yields of HCN of 60% per pass may be achieved with the remainder of the feed being converted to acetylene. These products may be separated and used or the acetylene may be recycled to produce more HCN. This process has the advantages, therefore, of high yields of HCN, low carbon formation, and the flexibility of operation and improvement in mechanical operation concomitant therewith. The actual temperature measurements recorded herein were taken from the reactor tube walls.

Numerous variations in the apparatus shown in Figure II may be made without departing from the invention. For example, the reactor may be any one of many suitable forms, such as a tube, an annulus formed between the inside wall of a tube and the outside wall of another tube inside it, or a sphere. The reactor may be made of graphite, carbon, tungsten, hafnium carbide, mixtures of materials such as zirconium oxide and zirconium carbide or tantalum carbide and hafnium carbide or any material capable of withstanding the reaction temperature for extended periods of time. The reactants may be preheated before entering the reactor or they may be introduced into the reactor at atmospheric temperature and heated therein by the radiant heat.

I claim:

1. A method of producing HCN which comprises intermixing nitrogen and a hydrocarbon in the vapor phase and subjecting the mixture so obtained to the action of a radiantly heated solid surface having a uniform non-fluctuating temperature between 2200 and 4000 degrees C. for a time sufficient to allow substantially complete reaction of the hydrocarbon and nitrogen to thereby produce a product containing HCN.

2. In a process for reacting nitrogen and a hydrocarbon at high temperatures to produce HCN, the steps which comprise intermixing the nitrogen and the hydrocarbon in the vapor phase, subjecting the mixed gases to the action of radiant heat at a uniform non-fluctuating temperature in the range of from 2200° C. to 4000° C., for a period of from 0.3 to 0.7 second, continuously withdrawing the product gas thus produced from said surface, immediately quenching said product gas, and recovering the HCN therefrom.

3. In a process for reacting nitrogen and methane at high temperatures to produce HCN, the steps which comprise preheating the nitrogen to between 2200 and 4000 degrees C. and preheating the methane to a temperature below its point of decomposition, mixing the preheated gases, subjecting the mixed gases to the action of radiant heat from an elongated surface at a non-fluctuating temperature of at least 2200° C. and not substantially in excess of 3200° C., for a period of from 0.3 to 0.7 second, continuously withdrawing the product gas thus produced from said surface, immediately quenching said product gas and recovering HCN therefrom.

References Cited in the file of this patent

UNITED STATES PATENTS

| | | |
|---|---|---|
| 1,050,978 | Moscicki et al. | Jan. 21, 1913 |
| 2,625,463 | Norton | Jan. 13, 1953 |